US008620328B2

(12) United States Patent
Kitazoe

(10) Patent No.: US 8,620,328 B2
(45) Date of Patent: Dec. 31, 2013

(54) HANDOVER PROCEDURES IN A WIRELESS COMMUNICATIONS SYSTEM

(75) Inventor: Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 1274 days.

(21) Appl. No.: 11/687,581

(22) Filed: Mar. 16, 2007

(65) Prior Publication Data

US 2008/0039092 A1 Feb. 14, 2008

Related U.S. Application Data

(60) Provisional application No. 60/784,606, filed on Mar. 21, 2006, provisional application No. 60/795,841, filed on Apr. 27, 2006.

(51) Int. Cl.
*H04W 36/00* (2009.01)

(52) U.S. Cl.
USPC ........... 455/442; 455/438; 455/444; 455/443; 455/432.1; 455/423; 370/338; 370/331

(58) Field of Classification Search
USPC ................... 455/436–444, 432.1, 426.2, 423; 370/328–338; 709/232, 200; 450/436, 450/426.2
See application file for complete search history.

(56) References Cited

U.S. PATENT DOCUMENTS 5,530,693 A * 6/1996 Averbuch et al. ............. 370/331
5,570,367 A * 10/1996 Ayanoglu et al. ............. 370/346
6,717,927 B2 4/2004 Chao et al.
7,013,143 B2 3/2006 Love et al.
7,046,648 B2 5/2006 Zhang et al.
7,212,821 B2 5/2007 Laroia et al.
7,266,105 B2 9/2007 Wu
2003/0142648 A1* 7/2003 Semper ......................... 370/331
2004/0203623 A1* 10/2004 Wu ............................ 455/412.1
2006/0058047 A1* 3/2006 Jeong et al. .................. 455/464
2006/0077923 A1 4/2006 Niwano (Continued)

FOREIGN PATENT DOCUMENTS

EP 0 695 053 * 1/1996
EP 0695053 * 1/1996

(Continued)

OTHER PUBLICATIONS

Verdone, R. et al.: "Analytical Evaluation of Blocking Probability in a Mobile Radio System with Directed Retry," IEEE Journal on Selected Areas in Communications, IEEE Service Center, Piscataway, US, vol. 19, No. 2, pp. 331-332, Feb. 2001, XP011055326.

(Continued)

*Primary Examiner* — Mahendra Patel
*Assistant Examiner* — Quan M Hua
(74) *Attorney, Agent, or Firm* — Liem T. Do

(57) ABSTRACT

Various techniques for handing over a wireless terminal from a serving node to a target node in a radio access network is disclosed. transferring a session in a cluster are disclosed. These techniques include exchanging messages between a wireless terminal and with a serving node to support a handover to a target node. Each of the messages includes an identifier. The wireless terminal is configured to determine whether it has received any stale messages from the target node following handover based on one or more of the identifiers.

20 Claims, 11 Drawing Sheets

(56) References Cited

U.S. PATENT DOCUMENTS

| | | | | |
|---|---|---|---|---|
| 2006/0209869 | A1 | 9/2006 | Kim et al. | |
| 2008/0089292 | A1 | 4/2008 | Kitazoe et al. | |
| 2008/0254800 | A1* | 10/2008 | Chun et al. | 455/438 |
| 2009/0196239 | A1 | 8/2009 | Lee et al. | |

FOREIGN PATENT DOCUMENTS

| | | | |
|---|---|---|---|
| EP | 1337125 | | 8/2003 |
| JP | 8065355 | A | 3/1996 |
| WO | WO03087978 | A2 | 10/2003 |

OTHER PUBLICATIONS

Chun-Ting Chou et al.: "An enhanced inter-access point for uniform intra and intersubnet hand offs" IEEE Transactions on mobile computing, IEEE New York, NY, US, vol. 4, No. 4, Jul. 2005, pp. 321-334, XP011133503.
Favalli L et al.: "Performance comparison of different TCP schemes over UTA-TDD channels" Vehicular technology conference, 2005. VTC-2005-Fall, 2005, Piscataway, NJ, USA. IEEE, Sep. 25, 2005, pp. 2680-2683, XP010879049.
3rd Generation Partnership Project: Technical Specification Group Radio Access Network; Interlayer Procedures in Connected Mode (Release 1999); 3GPP TS 25.303 V.3.9.0 (Sep. 2001) ETSI TS 125 303, XP014008610.
3GPP TSG-RAN WG2 Meeting #48—Document #R2-051969—QUALCOMM: "Enhanced HSDPA Re-pointing Scheme," (Aug. 26, 2005) pp. 1-8. XP002416750.
3GPP TSG-RAN WG2 #46bis Meeting—Document #R2-051087—China Mobile Communications Corporation: "HSDPA/HSUPA Performance Enhancement to Support IMS Realtime Services," (Apr. 4, 2005). pp. 1-6, XP002368691.
Verdone, R. et al. "Analytical Evaluation of Blocking Probability in a Mobile Radio System with Directed Retry," IEEE Journal on Selected Areas in Communications, pp. 332-331, vol. 19, No. 2 (Feb. 2001), XP011055326.
International Search Report, PCT/US2004/064514—International Search Authority—European Patent Office—Oct. 31. 2007.
Written Opinion, PCT/US2004/064514—International Search Authority—European Patent Office—Oct. 31, 2007.
International Preliminary Report on Patentability, PCT/US2004-064514—International Bureau of WIPO—Sep. 23, 2008.
Taiwan Search Report—TW096109773—TIPO—Mar. 21, 2011.

* cited by examiner

HANDOVER PROCEDURES IN A WIRELESS COMMUNICATIONS SYSTEM

PRIORITY

The present application claims priority to provisional U.S. Application Ser. No. 60/784,606, Mar. 21, 2006, and Ser. No. 60/795,841, filed Apr. 27, 2006, both assigned to the assignee hereof and incorporated herein by reference.

BACKGROUND

1. Field

The present disclosure relates generally to telecommunications, and more particularly, to various concepts and techniques for handover in a wireless communications system.

2. Background

Wireless communication networks are widely deployed to provide various communication services such as telephony, video, data, messaging, broadcasts, and so on. The networks may be multiple access networks capable of supporting communications for multiple users by sharing the available network resources. An example of such a network is a Universal Terrestrial Radio Access Network (UTRAN). UTRAN is the Radio Access Network (RAN) that is part of the Universal Mobile Telecommunications System (UTMS), a third generation (3G) mobile phone technology promulgated by the "3rd Generation Partnership Project" (3GPP). UMTS, which is the successor to Global System for Mobile Communications (GSM), currently uses Wideband Code Division Multiple Access (W-CDMA) as the underlying air interface in the UTRAN architecture with the existing GSM infrastructures for the core network.

In the UTRAN architecture, the RAN is divided into a number of Radio Network Subsystems (RNS), each controlled by a Radio Network Controller (RNC). The RNC is a node responsible for, among other things, assigning, reconfiguring and releasing radio resources within the RNS. The RNCs may be interconnected through an interface comprising a direct physical connections or virtual networks using any suitable transport network.

The geographic region covered by a RNS is divided into a number of cells, with a base station serving each cell. A base station, which is referred to as a Node-B, is a node having a radio transceiver to support an air interface with all wireless terminals in its cellular region. A wireless terminal, which is referred to as "user equipment" (UE), uses a Radio Resource Control (RRC) protocol to obtain radio resources. RRC is a link layer protocol which is terminated at the RNC. Below the RRC layer in the protocol stack is another link layer protocol known as Radio Link Control (RLC). The RLC layer, which is terminated at the Node-B, provides for the retransmission of data and controls to achieve a lower error rate than the physical layer could achieve alone.

As the UE roams from one cell to another in a RAN, various handover procedures are implemented to ensure that the UE maintains its connection with the core network. A handover is a process in which the RAN changes the radio transceivers to provide bearer services maintaining a defined service level. Handover may be initiated by the UE or the RAN based on transmission criteria (e.g., signal strength, signal quality, power level, propagation delay, etc.) as well as traffic criteria (e.g., load balancing, backhaul constraints, maintenance, etc.).

A RNS handover procedure involves tearing down the RLC connection with a serving Node-B and reestablishing it with a target Node-B. The procedure also requires transferring the RRC context (i.e., RRC connection) between the serving and target RAN. A problem arises when RRC messages are lost in transet as the RLC connection is being torn down and reestablished. This tends to result in dropped calls. Because the handover of the wireless terminal between RNSs is far less frequent than the handover between cells within a RNS, the level of dropped calls have not gained much attention.

Evolved UTRAN (E-UTRAN) is 3GPP's proposal of an evolution of the 3G W-CDMA system. An E-UTRAN architecture includes Evolved Node-Bs (eNode-B) dispersed through the RNS to support an air interface with wireless terminals. The RNCs have been replaced with Evolved Packet Cores (EPC) and moved from the RAN to the core network. As a result, the RRC layer has been pushed down into the eNode-B. With the RRC terminated at the eNode-B, the frequency of dropped calls from lost RRC messages will likely increase. Accordingly, there is a need in the art for a more robust handover procedure in E-UTRAN architectures. The solution should be generic enough to be extended to other network architectures.

SUMMARY

One aspect of a wireless terminal is disclosed. The wireless terminal includes a processor configured to exchange messages with a serving node to support a handover to a target node in a radio access network, wherein each of the messages includes an identifier, the processor being further configured to determine whether it has received any stale messages from the target node following handover based on one or more of the identifiers.

Another aspect of a wireless terminal is disclosed. The wireless terminal includes a processor configured to exchange messages with a serving node to support a handover to a target node in the radio access network, wherein the messages received from the serving node include reconfiguration information, and wherein the processor is further configured to retain at least a portion of the reconfiguration information following a failed attempt to handover the wireless terminal to the target node.

A further aspect of a wireless terminal is disclosed. The wireless terminal includes means for exchanging messages with a serving node to support a handover to a target nods in a radio access network, wherein each of the messages includes an identifier, and means for determining whether the wireless terminal has received any stale messages from the target node following handover based on one or more of the identifiers.

A yet another aspect of a wireless terminal is disclosed. The wireless terminal includes means for exchanging messages with a serving node to support a handover to a target node in a radio access network, wherein the messages received from the serving node include reconfiguration information, and means for retaining at least a portion of the reconfiguration information following a failed attempt to handover the wireless terminal to the target node.

An aspect of a method of handing over a wireless terminal from a serving node to a target node in a radio access network is disclosed. The method includes exchanging messages with a serving node to support the handover of the wireless terminal, wherein each of the messages includes an identifier, and determining whether the wireless terminal has received any stale messages from the target node following handover based on one or more of the identifiers.

Another aspect of a method of handing over a wireless terminal from a serving node to a target node in a radio access network is disclosed. The method includes exchanging messages with a serving node to support the handover of the wireless terminal, wherein the messages received from the serving node include reconfiguration information, and retaining at least a portion of the reconfiguration information following a failed attempt to handover the wireless terminal to the target node.

An aspect of a computer-readable medium for use in a wireless terminal to handover the wireless terminal from a serving node to a target node in a radio access network is disclosed. The computer-readable medium including instructions stored thereon, the instructions include a first code segment to exchange messages with a serving node to support the handover of the wireless terminal, and a second code segment to determine whether the wireless terminal has received any stale messages from the target node following handover based on one or more of the identifiers.

Another aspect of a computer-readable medium for use in a wireless terminal to handover the wireless terminal from a serving node to a target node in a radio access network is disclosed. The computer-readable medium including instructions stored thereon, the instructions include a first code segment to exchange messages with a serving node to support the handover of the wireless terminal, wherein the messages received from the serving node include reconfiguration information, and a second code segment to retain at least a portion of the reconfiguration information following a failed attempt to handover the wireless terminal to the target node.

It is understood that other aspects of the invention will become readily apparent to those skilled in the art from the following detailed description, wherein it is shown and described only various aspects of tire invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1A:
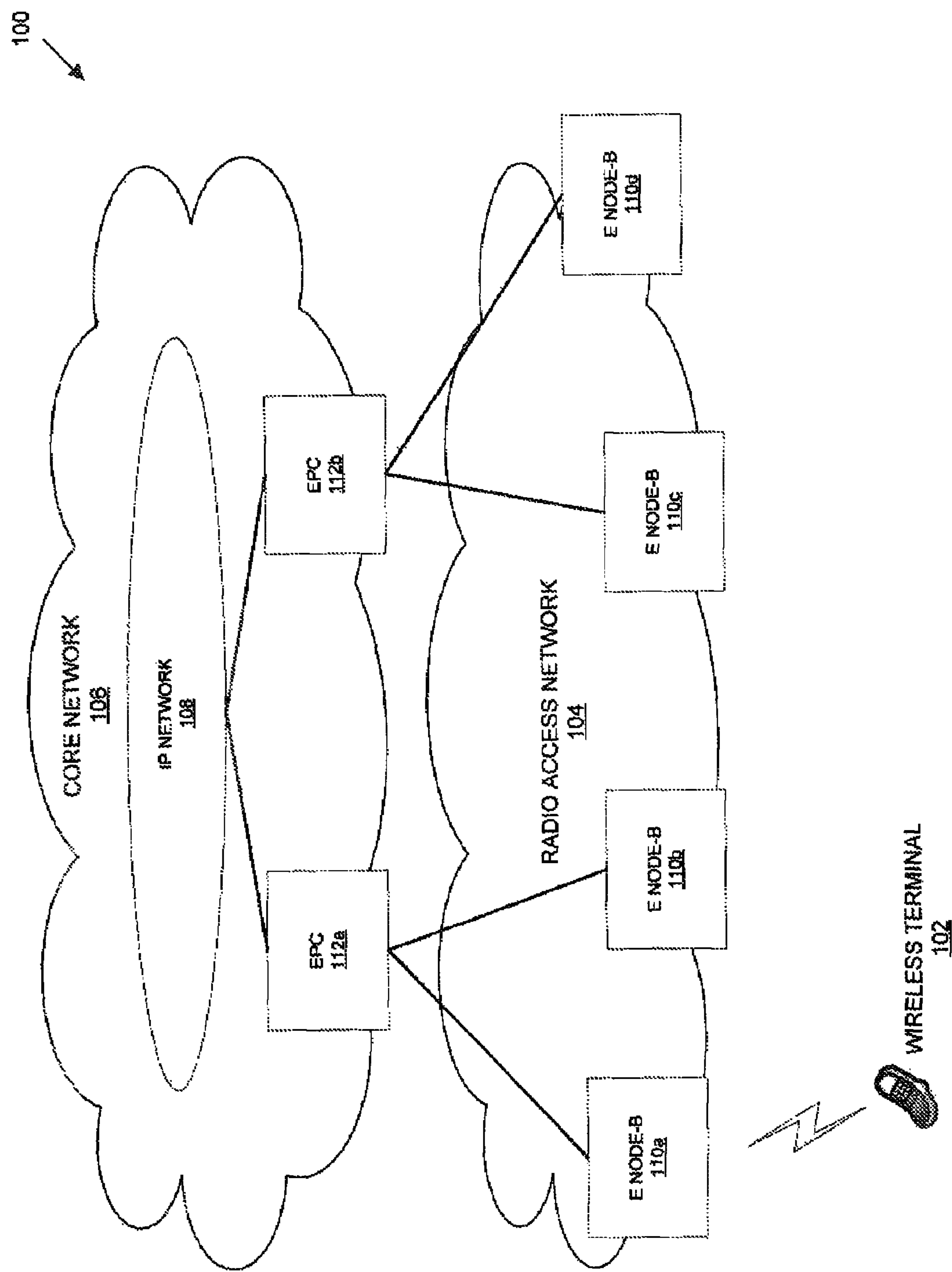
FIG. 1A is a conceptual diagram illustrating an example of a wireless terminal in a telecommunications system.

Various concepts presented throughout this disclosure may be utilized across a broad array of telecommunication systems, network architectures and communication protocols. One non-limiting example is shown in FIG. 1A with a wireless terminals 102 connected to a core network 106 through a RAN 104. In this example, the RAN 104 is an E-UTRAN and the core network 106 is an Internet Protocol (IP) network 108, however, other radio access technologies and core networks may be deployed. The wireless terminals 102 may be any suitable mobile device, including by way of example, a mobile or cellular telephone, a personal digital assistant (PDA), a portable television, a laptop computer, a digital camera, a digital camcorder, a game console, a portable audio device, a portable radio, or any other suitable device capable of supporting a radio link with a transceiver in the RAN 302.

The telecommunications system 100 shown in FIG. 1A includes a number of eNodes-B distributed throughout the RAN 104. For clarity of presentation, four eNode-Bs 110*a*-110*d* are shown, however, any number of eNode-Bs may be used to cover the geographic region of the telecommunications system 100. Each eNode-B 110*a*-110*d* serves the traditional role of a radio transceiver by providing an air interface and a RLC connection to the UEs in its geographic region of coverage.

The RNC in traditional UTRAN architectures has been replaced by the EPC in the E-UTRAN architecture. In the example shown in FIG. 1A, two EPCs 112*a*, 112*b* are deployed, however, any number of EPCs may be used in actual implementation depending on the geographic reach of the RAN 104. The EPC resides in the core network 106, as a result, a number of link layer functions traditionally performed by the RNC have been pushed down to the eNode-Bs 110*a*-110*d* in the RAN 104. These link layer functions include establishing, maintaining, reconfiguring and terminating the RRC connection with the wireless terminals. A direct physical connection is shown between the EPCs 112*a*, 112*b*, but alternatively, a virtual network connection may be maintained through the IP network 108 or by any other suitable transport network.

Figure 1B:
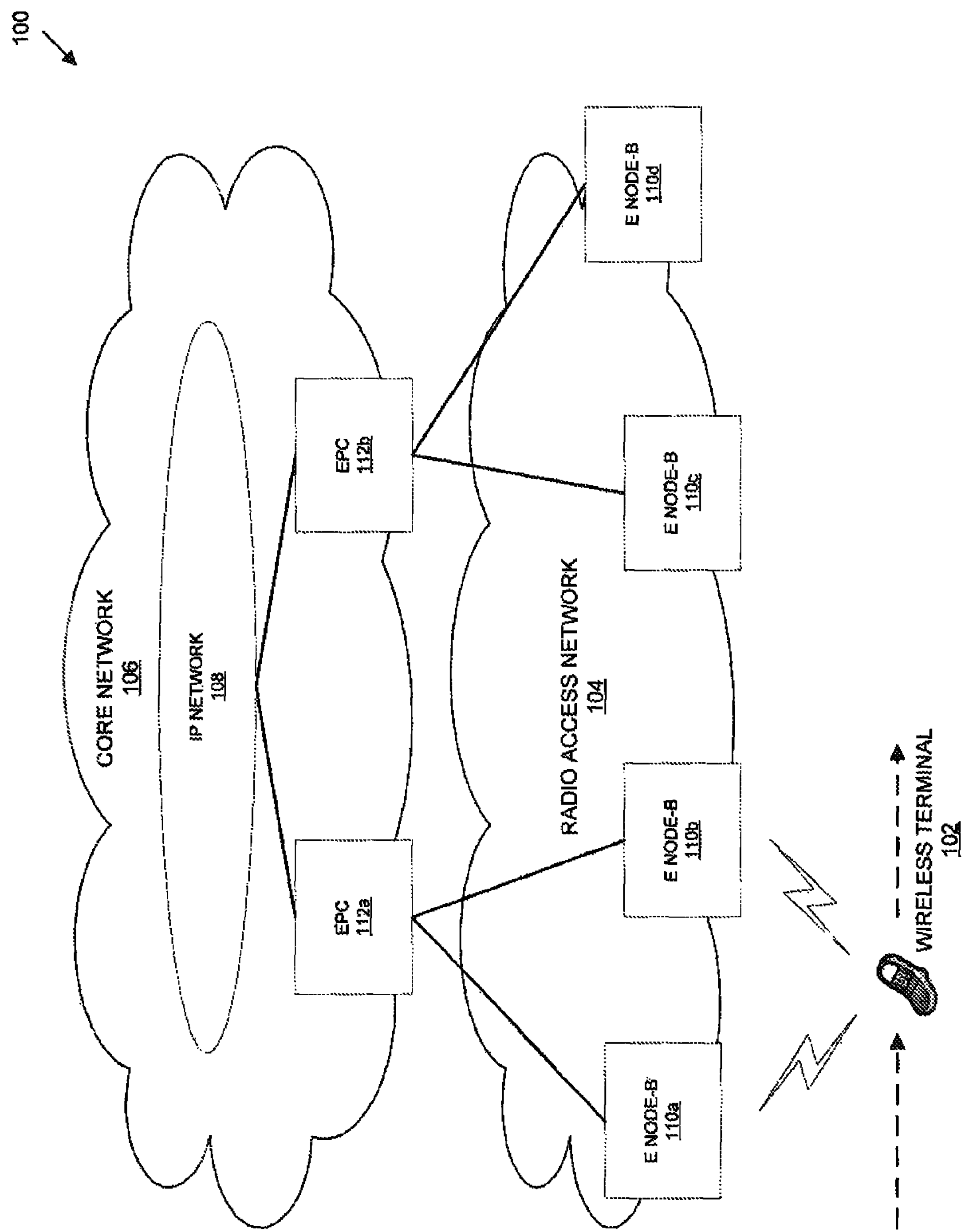
FIG. 1B is a conceptual diagram illustrating an example of a wireless terminal roaming in a telecommunications.

The wireless terminal 102 is shown in communication with an eNode-B 110*a*. This eNode-B 110*a* is referred to as a "serving" eNode-B because it serves as an access point to the RAN 104 for the wireless terminal 102. In FIG. 1B, the wireless terminal 102 is shown moving out of the coverage region of the serving eNode-B 110*a* by a series of broken lines. While in communication with the serving eNode-B 110*a*, the wireless terminal 102 may periodically search for signals from nearby eNode-Bs in order to detect any eNode-Bs that can provide better service than the serving eNode-B 110*a*. The UE 102 may send measurement reports to the serving eNode-B 110*a*. As the UE 102 continues down its path, the signal from nearby eNode-B 110*b* becomes sufficiently stronger than the signal from the serving eNode-B 110*a* to warrant a handover. In this example, the nearby eNode-B 110*b* becomes the "target" eNode-B because it is the target of the handover. As will be described in the following paragraphs, the handover from the serving eNode-B 110*a* to the target eNode-B 110*b* may be initiated by the RAN 104 or wireless terminal 102. For clarity of presentation, only the most pertinent RRC messages to affect a handover will be described, however, those skilled in the art will readily understand that additional RRC messages may be required in actual implementations, in any event, once the handover is complete, the target eNode-B 110*b* becomes the serving eNode-B for the wireless terminal 102.

Figure 2:
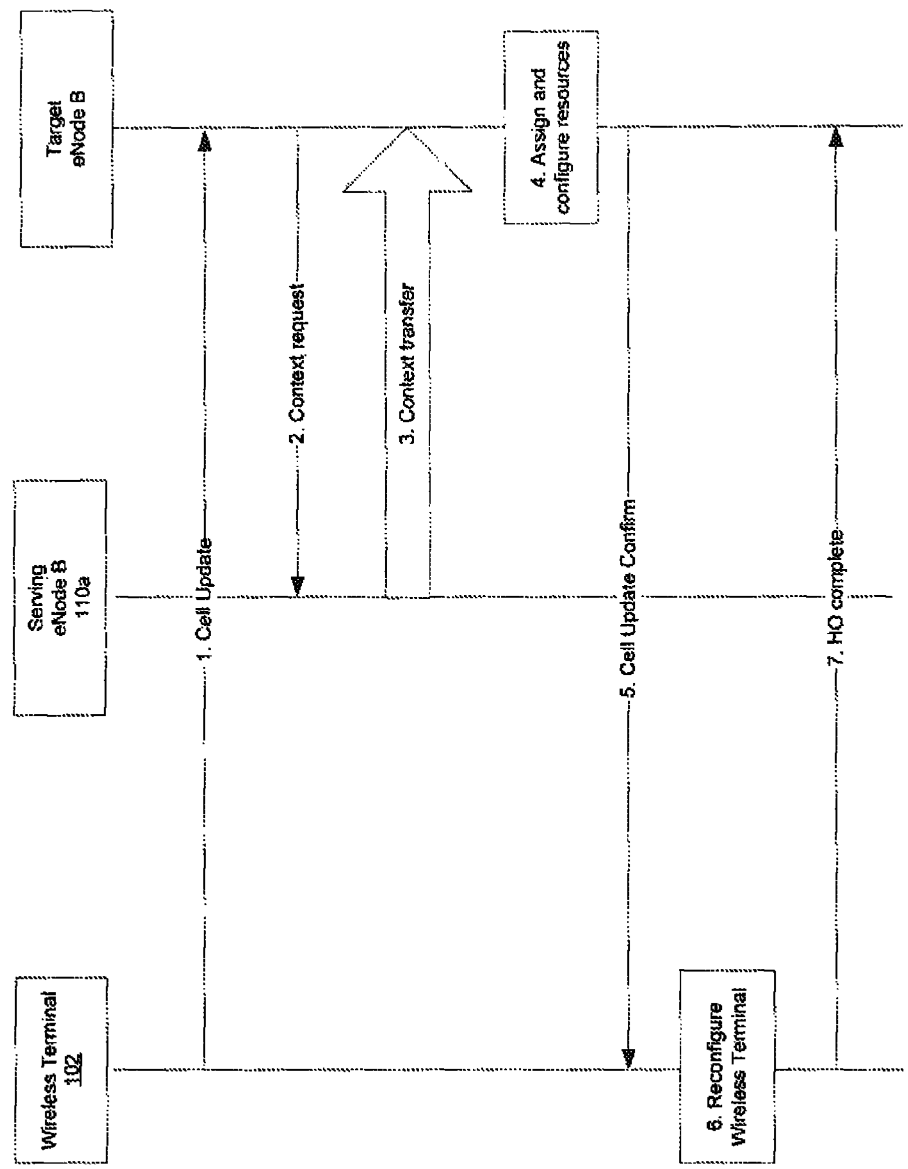
FIG. 2 is a diagram illustrating an example of the signaling for a handover procedure initiated by a wireless terminal.

FIG. 2 is a diagram illustrating an example of the RRC messages used in a wireless terminal initiated handover procedure. In this example, the wireless terminal 102 monitors the signals from all nearby eNode-Bs as it moves out of the coverage region of the serving eNode-B 110*a*. At some point, the wireless terminal 102 decides to initiate a handover by sending a cell update message (i.e., handover request) to the target eNode-B 110*b* (step 1). The cell update message contains the identification (ID) of the serving eNode-B. The target eNode-B 110*b* then sends a context request message to the serving eNode-B 110*a* to request a transfer of the RRC context (step 2). The RRC context may include pertinent information used for radio communications (e.g., the protocol state, the quality of service parameters, and so on). The RRC context is then transferred by the serving eNode-B 110*a* to the target eNode-B 110*b* (step 3). Once the RRC context is received, the target eNode-B 110*b* assigns and configures the radio resources necessary to support a new connection with the wireless terminal 102 (step 4). The target eNode-B 110*b* then sends a cell update confirm message to the wireless terminal 102 (step 5). Upon receiving the cell update confirm message, the wireless terminal 102 reconfigures itself for handover (e.g., tears down the protocol stacks for the serving eNode-B 110*a* and establishes the protocol stacks for the target eNode-B 110*b*) (step 6). After the wireless terminal 102 has reconfigured itself, it sends a handover complete message to the target eNode-B 110*b* to complete the handover procedure (step 7).

Figure 3:
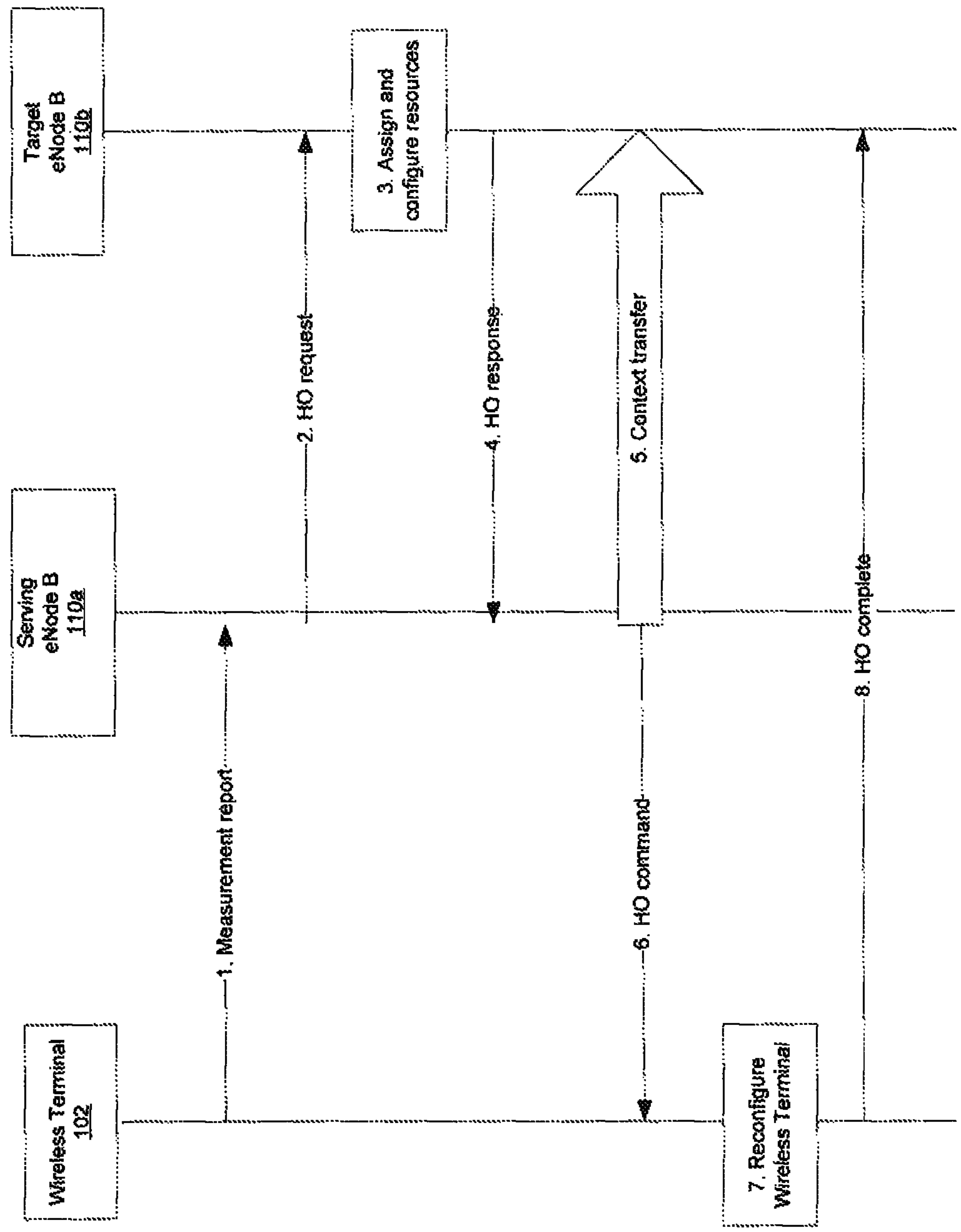
FIG. 3 is a diagram illustrating an example of the signaling for a handover procedure initiated by a radio access network.

FIG. 3 is a diagram illustrating an example of the RRC messages used in a RAN initiated handover procedure. In this example, the serving eNode-B 110*a* decides to handover the wireless terminal 102 to a target eNode-B 110*b* based on a measurement report received from the wireless terminal 102 (step 1). The serving eNode-B 110*a* initiates the handover by sending a handover request message to the target eNode-B 110*b* (step 2). In response to the handover request message, the target eNode-B 110*b* assigns and configures the radio resources necessary to support a new connection with the wireless terminal 102 (step 3). Once this occurs, the target eNode-B 110*b* send a handover response message to the serving eNode-B 110*a* indicating that it is ready to receive a handover of the wireless terminal 102 (step 4). In response to the handover response message, the serving e-Node-B 110*a* transfers the RRC context to the target eNode-B 110*b* (step 5). The serving eNode-B 110*a* also sends a handover command to the wireless terminal 102 (step 6). Upon receiving the handover command, the wireless terminal 102 reconfigures itself for handover (step 7). After the wireless terminal 102 has reconfigured itself, it sends a handover complete message to the target eNode-B 110*b* to complete the handover procedure (step 8).

With the handover procedures just described, there is a possibility that the wireless terminal 102 or the target eNode-B 110*b* may receive stale RRC messages following the completion of the handover. An example will now be presented with reference to FIG. 4. In this example, the serving eNode-B 110*a* decides to handover the wireless terminal 102 to a target eNode-B 110*b* based on a measurement report received from the wireless terminal 102 (step 1). Following an exchange of messages with the target eNode-B 110*b*, the serving eNode-B 110*a* initiates the handover by sending a handover command to the wireless terminal 102 (step 2). However, in this case, the wireless terminal 102 does not receive the handover command because, for example, the wireless terminal 102 has traveled too far out of the coverage region of the serving eNode-B 110*a*. At some point, as the wireless terminal 102 travels further into the coverage region of the target eNode-B 110*b*, it initiates its own handover by sending a cell update message to the target eNode-B 110*b* (step 3). In response to the cell update message, the target eNode-B 110*b* sends a context request, message to the serving eNode-B 110*a* (step 4) and the serving e-Node-B 110*a* transfers the RRC context back to the target eNode-B 110*b* (step 5). Next, the target eNode-B 110*b* assigns and configures the radio resources necessary to support the new connection with the wireless terminal 102 (step 6) and then sends a cell update confirm message to the wireless terminal 102 (step 7). Upon receiving the cell update confirm message, the wireless terminal 102 reconfigures itself for handover (step 8). After the wireless terminal 102 has reconfigured itself, it sends a handover complete message to the target eNode-B 110*b* to complete the handover procedure (step 9). Once the handover is complete, the RLC layer in the target eNode-B 110*b*, being an acknowledgement based retransmission protocol, resends to the wireless terminal 102 the handover command (step 10). The problem is that the RRC layer in the wireless terminal 102 does not know which eNode-B the handover command originated with. In this example, the handover command was originally sent from the serving eNode-B 110*a*, and therefore, it is a stale RRC message when later received by the wireless terminal 102 from the target eNode-B 110*b* (i.e., the new serving eNode-B) following handover.

Stale RRC messages that are received by either the wireless terminal 102 or the target eNode-B 110*b* following handover can be addressed with identifiers, such as sequence numbers or some other means of identification. In one example of a telecommunications system, each RRC message sent between the wireless terminal 102 and the serving eNode-B 110*a* can include a sequence number. The sequence numbers assigned to the uplink RRC messages are independent of the sequence numbers assigned to the downlink RRC messages. The wireless terminal 102, in an uplink RRC message to the target eNode-B 110*b* includes the highest sequence number for the RRC messages sent by the wireless terminal 102 to the serving eNode-B 110*a*. Similarly, the target eNode-B 110*b*, in a downlink RRC message includes the highest sequence number for the RRC messages sent by the serving eNode-B 110*b* to the wireless terminal 102. After the handover is completed, the wireless terminal 102 and the target eNode-B 110*b* can identify stale RRC messages. An example will now be provided with reference to FIG. 5.

Figure 4:
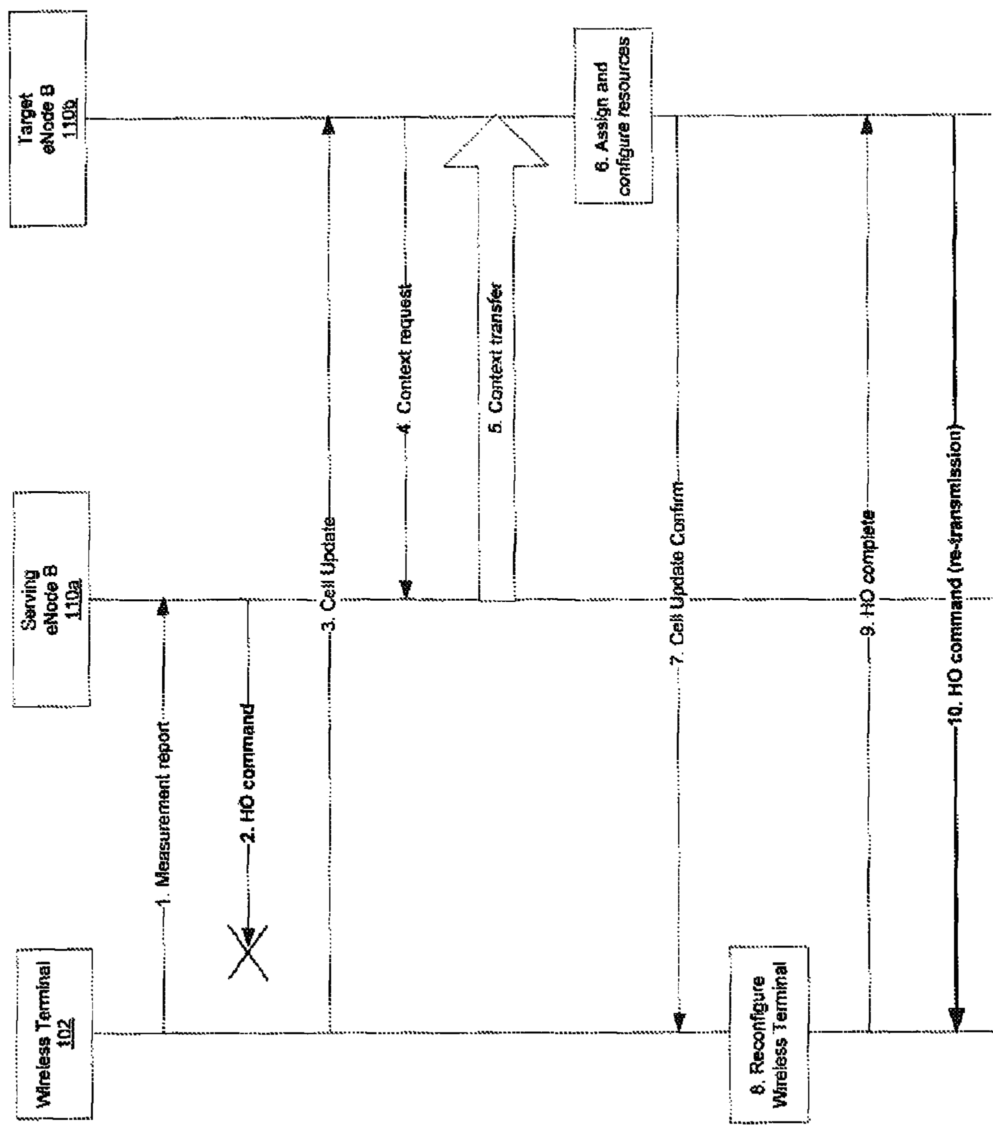
FIG. 4 is a diagram illustrating an example of the signaling in a handover procedure in which the wireless terminal receives stale messages.
Figure 5:
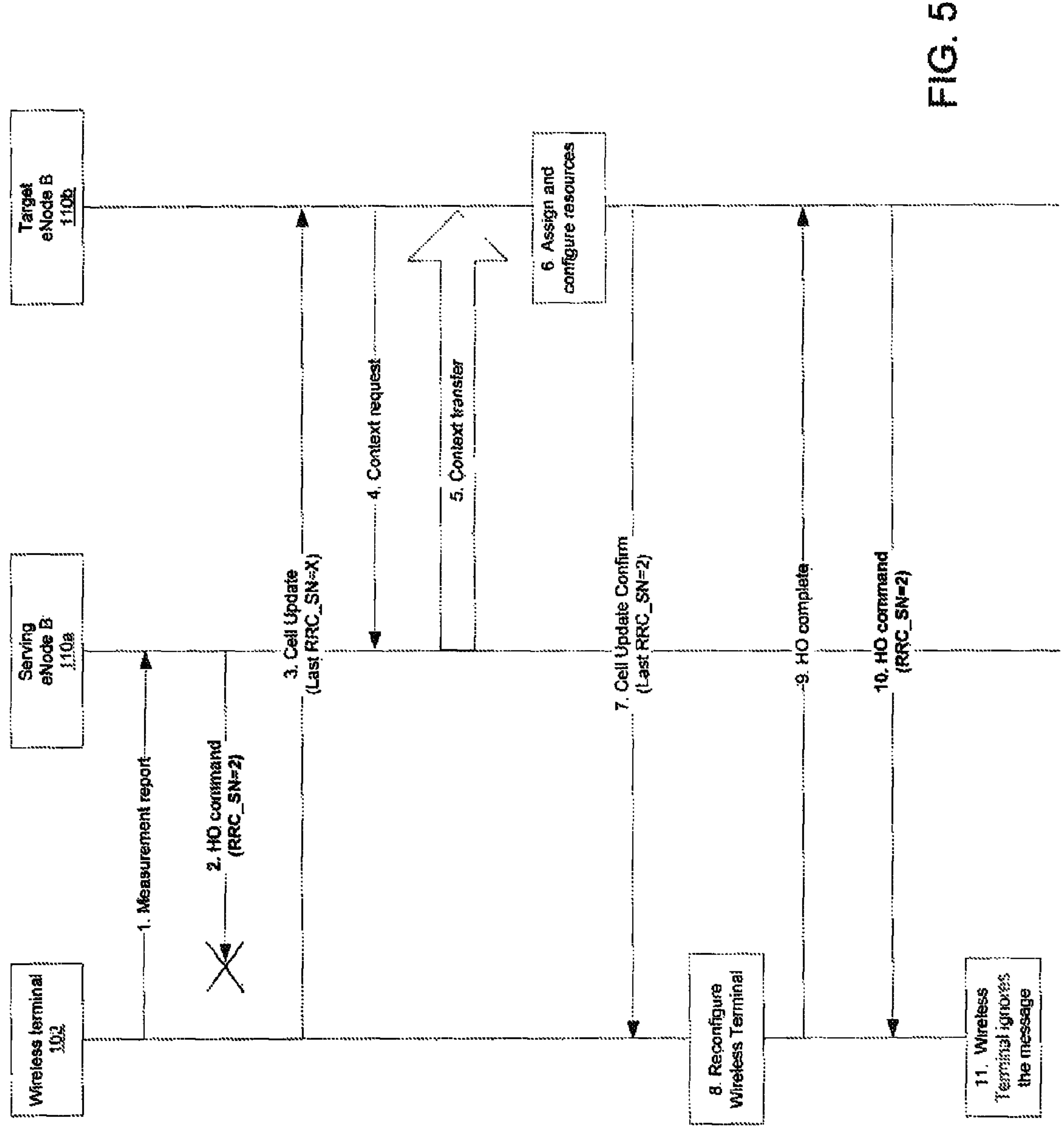
FIG. 5 is a diagram illustrating an example of the signaling in a handover procedure to recognize stale messages.

Referring to FIG. 5, the serving eNode-B 110*a* decides to handover the wireless terminal 102 to the target eNode-B 110*b* based on the measurement report received from the wireless terminal 102 (step 1). The serving eNode-B 110*a* initiates the handover by sending a handover request message to the target eNode-B 110*b* (step 2). The handover request message includes the sequence number "2" indicating that the handover request message is the second uplink RRC message in the handover procedure. Similarly to the situation described earlier in connection with FIG. 4, the wireless terminal 102 does not receive the handover request message because, for example, it has traveled too far out of the coverage region of the serving eNode-B 110*a*. At some point, as the wireless terminal 102 travels further into the coverage region of the target eNode-B 110*b*, it initiates its own handover by sending a cell update message to the target eNode-B 110*b* (step 3). The cell update message includes the highest sequence number for the uplink RRC messages sent from the wireless terminal 102 to the serving e-Node B 110*a*. In response to the cell update message, the target eNode-B 110*b* sends a context request message to the serving eNode-B 110*a* (step 4) and the serving eNode-B 110*a* transfers the RRC context back to the target eNode-B 110*b* (step 5). In this example, the RRC context includes the highest, sequence number for the downlink RRC messages sent from the serving eNode-B 110*a* to the wireless terminal 102. In this example, the sequence number is "2". Once the RRC context is transferred, the target eNode-B 110*b* assigns and configures the radio resources necessary to support the connection with the wireless terminal 102 (step 6) and then sends a cell update confirm message to the wireless terminal 102 (step 7). The cell update confirm message includes the highest sequence number for the downlink RRC messages sent by the serving eNode-B 110*a*. Upon receiving the cell update confirm message, the wireless terminal 102 reconfigures itself for handover (step 8). After the wireless terminal 102 has reconfigured itself, it sends a handover complete message to the target eNode-B 110*b* to complete the handover procedure (step 9). Once the handover is complete, the RLC layer in the target eNode-B 110*b* then resends the handover command to the wireless terminal 102 with the sequence number "2" (step 10). Based on the cell update confirm message received from the target eNode-B 110*b*, the wireless terminal 102 recognizes all downlink RRC messages with a sequence number (SN) of "2" or less are stale. The stale RRC message can be ignored (step 11) as shown in FIG. 4. Ignoring the stale RRC message is an attractive approach, at least in the downlink direction, because the new serving eNode-B 110*b* has already configured the wireless terminal 102 with the cell update confirm message. Alternatively, the manner in which a stale RRC message is handled by the wireless terminal 102 may be left to network implementation.

Figure 6:
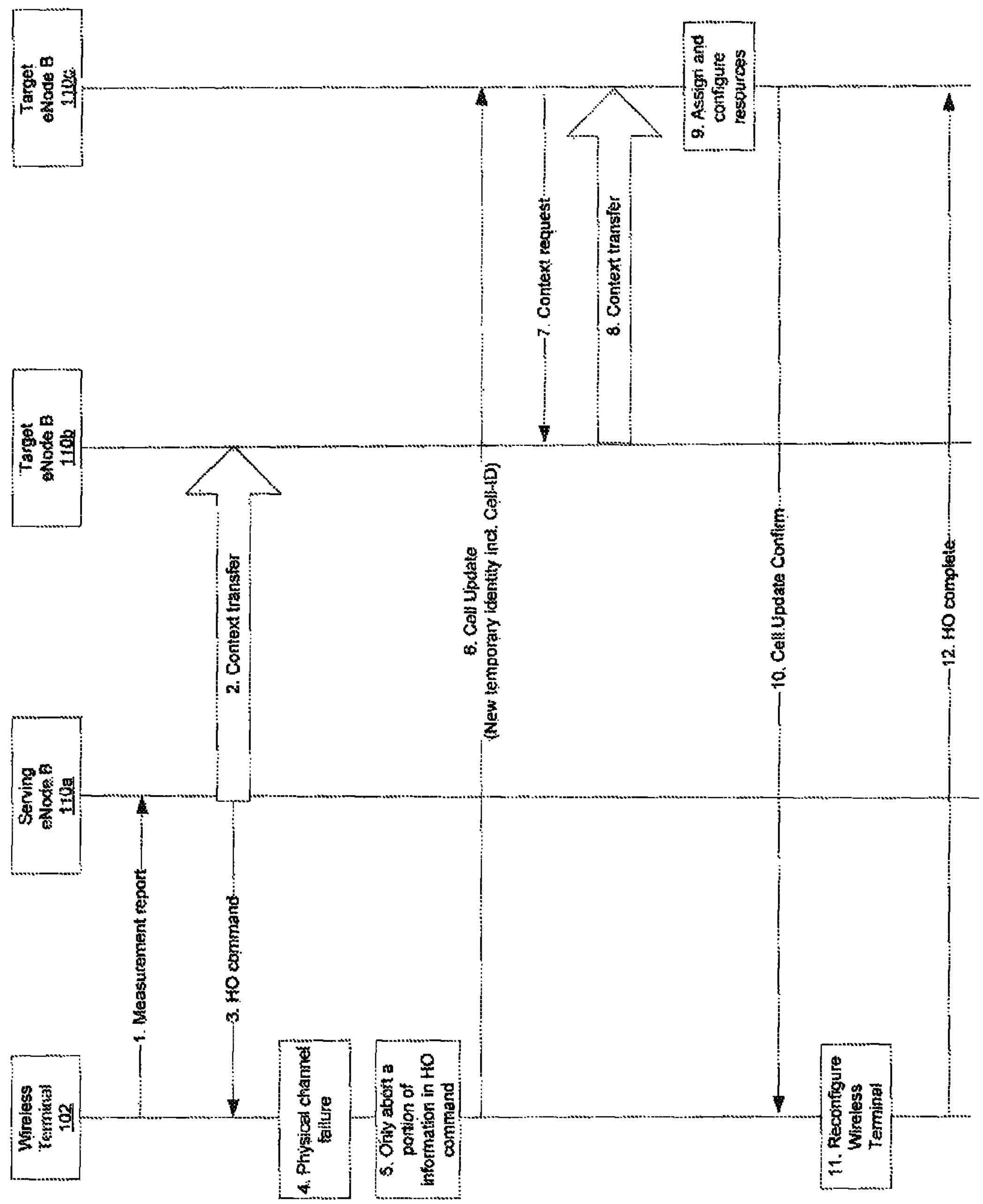
FIG. 6 is a diagram illustrating an example of the signaling for a handover procedure following a failed attempt.

The various handover procedures described thus far should be capable of recovering from a failed handover attempt, even after a reconfiguration RRC message is received by the wireless terminal 102. An example will now be presented with reference to FIG. 6. Referring to FIG. 6, the serving eNode-B 110*a* decides to handover the wireless terminal 102 to a target eNode-B 110*b* based on a measurement report received from the wireless terminal 102 (step 1). The serving eNode-B 110*a* and the target e-Node-B 110*b* then exchange RRC messages to allocate radio resources at the target eNode-B 110*b* to support the handover. The exchange of RRC messages also results in the RRC context being transferred from the serving eNode-B 110*a* to the target eNode-B 110*b* (step 2). As part of this transfer, the RLC context is also transferred. At the same time, or thereabouts, a handover command is sent from the serving eNode-B 110*a* to the wireless terminal 102 (step 3). The handover command includes a temporary ID for the wireless terminal 102 in the target eNode-B 110*b* as well as information required by the wireless terminal 102 to reconfigure itself for the handover (e.g., tear down the protocol stacks with the serving eNode-B 110*a* and establish new protocol stacks for the target eNode-B 110*b*). Should the wireless terminal 102 experience a subsequent failure (e.g., a physical channel failure) (step 4), then the wireless terminal 102 only aborts the portion of the handover command (step 5). More specifically, the wireless terminal 102 only aborts the reconfiguration information relating to the physical layer. The temporary ID and all other information for reconfiguring the protocol stack above the physical layer are maintained by the wireless terminal 102.

When the physical channel is restored, the wireless terminal 102 locates a new target eNode-B 110*c* and sends a cell update message to that eNode-B 110*c* (step 6). The cell update message includes the temporary ID for the wireless terminal 102 in the original target eNode-B 110*b*. The new target eNode-B 110*c* uses the temporary ID in the cell update message to request the RRC and RLC context for the wireless terminal 102 from the original target eNode-B 110*b* (step 7). In response to this request, the original target eNode-B 110*b* transfers the RRC and RLC context to the new target eNode-B 110*c* (step 8). Once the RRC and RLC context is received, the new target eNode-B 110*c* assigns and configures the radio resources necessary to support the connection with the wireless terminal 102 (step 9). The new target eNode-B 110*b* then sends a cell update confirm message to the wireless terminal 102 (step 10). Upon receiving the cell update confirm message, the wireless terminal 102 reconfigures itself for handover using the information retained from the handover command (e.g., tears down the protocol stacks for the serving eNode-B 110*a* and establishes the protocol stacks for the target eNode-B 110*b*) (step 11). After the wireless terminal 102 has reconfigured itself, it sends a handover complete message to the new target eNode-B 110*b* to complete the handover procedure (step 12).

Figure 7:
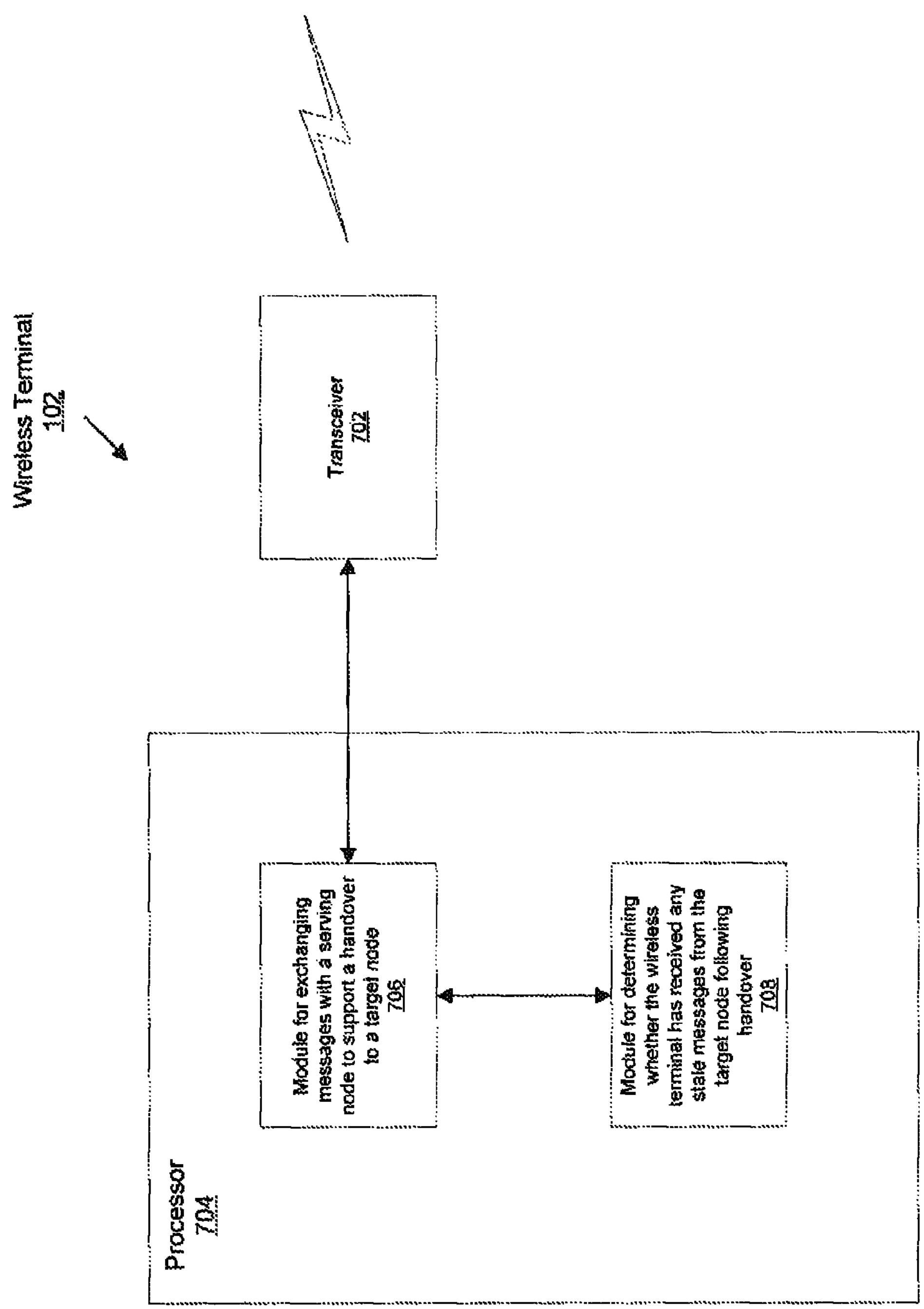
FIG. 7 is a functional block diagram illustrating an example of a wireless terminal.
Figure 8:
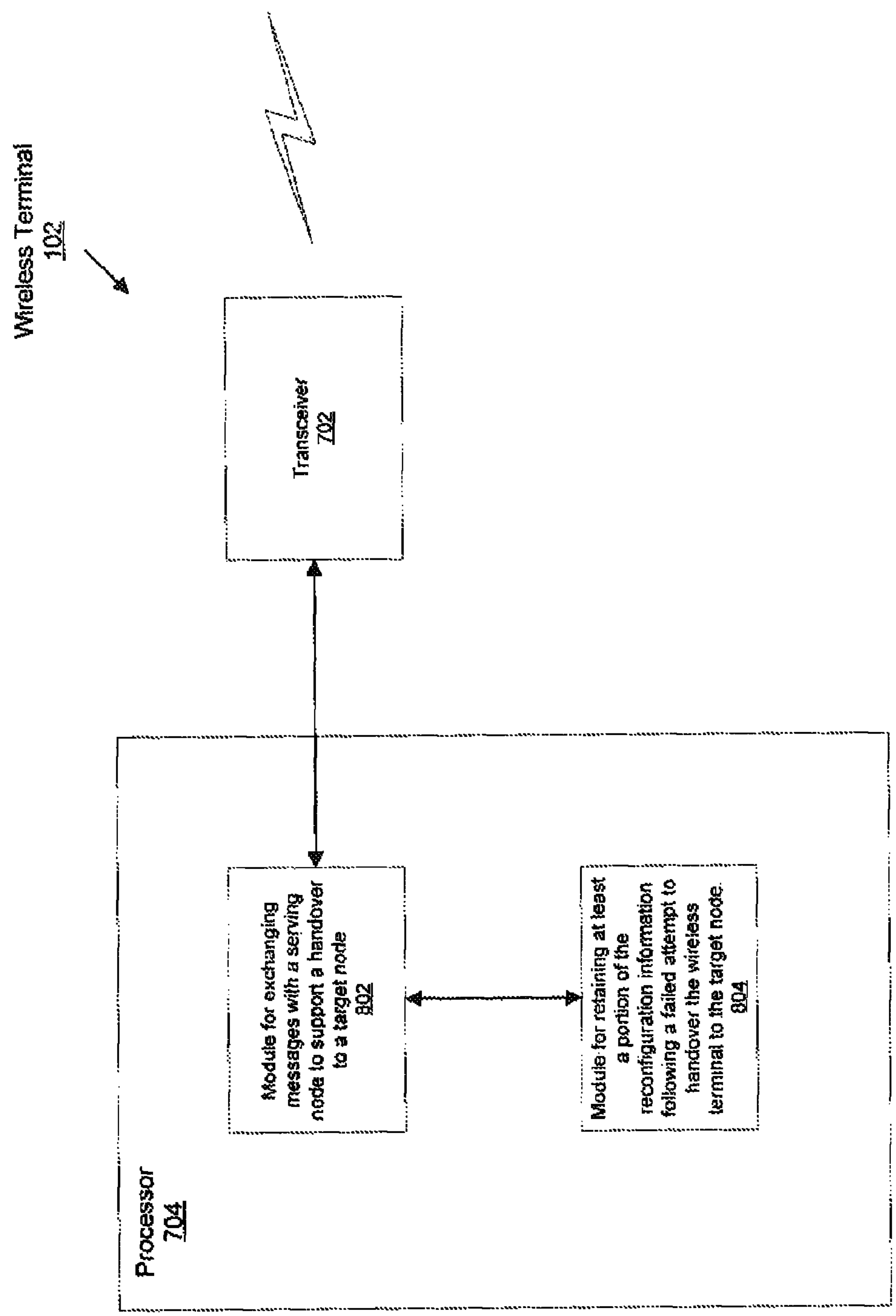
FIG. 8 is a functional block diagram illustrating another example of a wireless terminal.

FIGS. 7 and 8 are functional block diagrams illustrating examples of a wireless terminal. The wireless terminal 102 includes a transceiver 702 and a processor 704. In the E-UTRAN example described earlier, the transceiver 702 provides a W-CDMA air interface with the RAN, bit may support other air interfaces in alternative configurations. The processor 704 is shown with blocks to illustrate its functionality. These functional blocks may be implemented in hardware, software, firmware, middleware, microcode, hardware description languages, or any combination thereof. By way of example, one or both functional blocks may be implemented with program code or code segments running on a microprocessor, a digital signal processor (DSP), or any other suitable platform. A code segment may represent a procedure, a function, a subprogram, a program, a routine, a subroutine, a module, or any combination of instructions, data structures, or program statements. The program code or code segments may reside in computer readable media. The computer readable media may include one or more storage devices, including by way of example, RAM memory, flash memory, ROM memory, EPROM memory, EEPROM memory, registers, hard disk, a removable disk, a CD-ROM, or any other form of storage media known in the art. Computer readable media may also include a carrier wave that encodes a data signal. Alternatively, or in addition to, one or both functional blocks may be implemented with an application specific integrated circuit (ASIC), a controller, microcontroller, a state machine, a field programmable gate array (FPGA) or other programmable logic component, discrete gate or transistor logic, discrete hardware components, or any combination thereof. Those skilled in the art will recognize the interchangeability of hardware, firmware, and software configurations under these circumstances, and how best to implement the described functionality for each particular application.

In the wireless terminal shown in FIG. 7, the processor 704 includes a module 706 for exchanging messages with a serving node to support a handover to a target node in a radio access network, wherein each of the messages includes an identifier. The processor also includes a module 708 for determining whether the wireless terminal has received any stale messages from the target node following handover based on one or more of the identifiers.

In an alternative configuration of a wireless terminal, as shown in FIG. 8, the processor 704 includes a module 802 for exchanging messages with a serving node to support a handover to a target node in a radio access network, wherein the messages received from the serving node include reconfiguration information. The processor 704 also includes a module 804 for retaining at least a portion of the reconfiguration information following a failed attempt to handover the wireless terminal to the target node.

Figure 9:
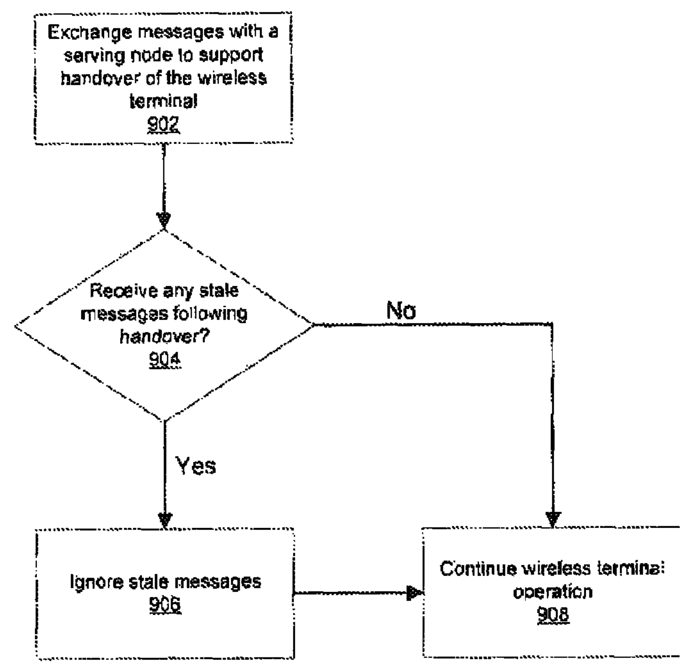
FIG. 9 is a flow chart illustrating an example of a method of handing over a wireless terminal from a serving node to a target node in a radio access network.

FIG. 9 is a flow chart illustrating an example of a method of handing over a wireless terminal from a serving node to a target node in a radio access network. In step 902, messages are exchanged between the wireless terminal and a serving node to support the handover of the wireless terminal, wherein each of the messages includes an identifier. In step 904, the wireless terminal determines whether it has received any stale messages from the target node following handover based on one or more of the identifiers. In one configuration of the wireless terminal, the identifiers are sequence numbers. In this configuration, the wireless terminal, after exchanging messages with the serving node, sends a message to the target node. The message indicates the highest sequence number for the messages sent to the serving node. The wireless terminal also receives a message, in this configuration, from the target node which indicates the highest sequence number for the messages received from the serving node.

An example of how the sequence numbers are used to identify stale messages in the downlink direction will be presented. In the downlink direction, the wireless terminal can determine whether it has received any stale messages from the target node by determining whether any message received from the target node has a sequence number equal to or less than the highest sequence number for the messages received from the serving node. If the wireless terminal determines that it has received any stale messages, then the stale messages are ignored in step 906 and the wireless terminal then continues operation in step 908. Conversely, if the wireless terminal determines that there are no stale messages, then it simply continues operation in step 908.

Figure 10:
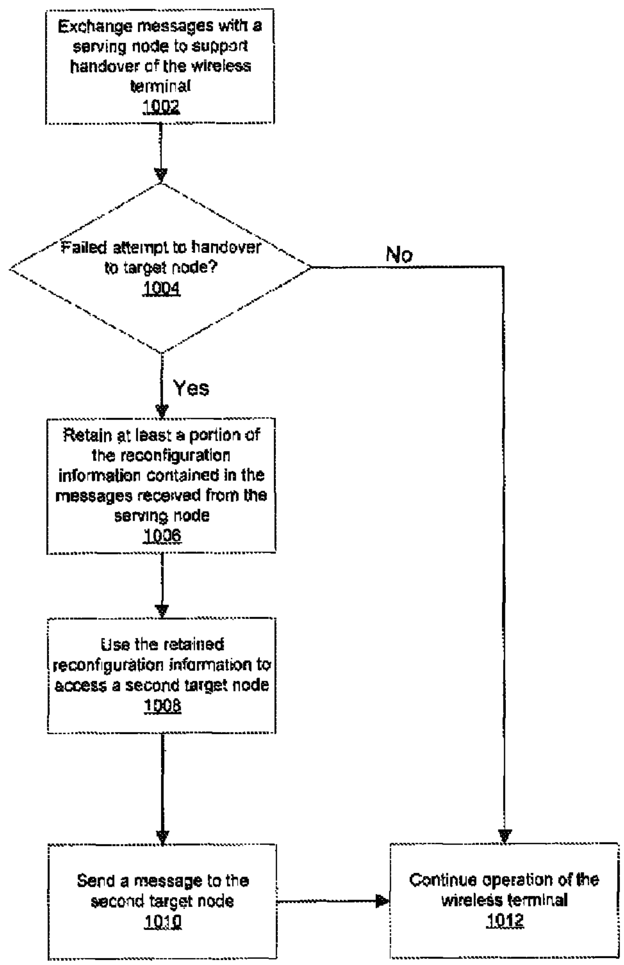
FIG. 10 is a flow chart illustrating an example of a method of handing over a wireless terminal from a serving node to a target node in a radio access network.

FIG. 10 is a flow chart illustrating another example of a method of handing over a wireless terminal from a serving node to a target node in a radio access network. In step 1002, the wireless terminal exchanges messages with a serving node to support handover of the wireless terminal to a target node. If the handover attempt fails in step 1004 (e.g., a physical channel failure), then the wireless terminal, in step 1006, retains a portion of the reconfiguration information in the messages received from the serving node. Next, in step 1008, the wireless terminal uses the retained reconfiguration information to access a second target node. The wireless terminal sends a message to the second target node in step 1010. The message sent to the second target node includes an identifier for the wireless terminal in the target node. This identifier may be part of the reconfiguration information retained by the wireless terminal following the failed attempt at handover. Once this message is sent, the second target node can retrieve from the original target node the connection information to support the wireless terminal and allow it to continue operation in step 1012. Returning to step 1004, if the handover attempt is not a failure, then the wireless terminal moves to step 1012 to continue operation.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless terminal, comprising:

a memory module; and at least one processor coupled to the memory module, the at least one processor being configured:

to exchange messages with a serving node to support a handover to a target node in a radio access network, each of the exchanged messages being assigned an identifier comprising sequence numbers, and sequence numbers assigned to uplink messages being independent of sequence numbers assigned to downlink messages;

to determine whether the wireless terminal has received a stale message when a first handover command message is not received from a serving node, the stale message comprising a second handover command message from the target node transmitted after the handover based on the identifier, and to abort a portion of a reconfiguration following an error in the handover when the first handover command message is received from the serving node, the error being based on reconfiguration information received in a downlink message.

2. The wireless terminal of claim 1, wherein the processor is further configured to transmit a message to the target node to support the handover of the wireless terminal, wherein the message indicates the highest sequence number for the messages sent to the serving node.

3. The wireless terminal of claim 1, wherein the processor is further configured to receive a message from the target node to support the handover of the wireless terminal, wherein the message received from the target node indicates the highest sequence number for the messages received from the serving node.

4. The wireless terminal of claim 3, wherein the processor is further configured to determine that a message received from the target node comprises a sequence number equal to or less than the highest sequence number of the messages received from the serving node is a stale message.

5. The wireless terminal of claim 1, wherein the processor is further configured to ignore the stale message received from the target node following the handover.

6. A wireless terminal, comprising:

means for exchanging messages with a serving node to support a handover to a target node in a radio access network, each of the exchanged messages being assigned an identifier comprising sequence numbers, and sequence numbers assigned to uplink messages being independent of sequence numbers assigned to downlink messages;

means for determining whether the wireless terminal has received a stale message when a first handover command message is not received from a serving node, the stale message comprising a second handover command message from the target node transmitted after the handover based on the identifier; and means for aborting a portion of a reconfiguration following an error in the handover when the first handover command message is received from the serving node, the error being based on reconfiguration information received in a downlink message.

7. The wireless terminal of claim 6, further comprising means for transmitting a message to the target node to support the handover of the wireless terminal, wherein the message indicates the highest sequence number for the messages sent to the serving node.

8. The wireless terminal of claim 6, further comprising means for receiving a message from the target node to support the handover of the wireless terminal, wherein the message received from the target node indicates the highest sequence number for the messages received from the serving node.

9. The wireless terminal of claim 8, wherein the means for determining whether the wireless terminal has received the stale message from the target node comprises means for determining that a message received from the target node comprises a sequence number equal to or less than the highest sequence number of the messages received from the serving node is a stale message.

10. The wireless terminal of claim 9, further comprising means for ignoring the stale message received from the target node following handover.

11. A method of handing over a wireless terminal from a serving node to a target node in a radio access network, comprising:

exchanging messages with a serving node to support the handover of the wireless terminal, each of the exchanged messages being assigned an identifier comprising sequence numbers, and sequence numbers assigned to uplink messages being independent of sequence numbers assigned to downlink messages;

determining whether the wireless terminal has received a stale message when a first handover command message is not received from a serving node, the stale message comprising a second handover command message from the target node transmitted after the handover based on the identifier; and aborting a portion of a reconfiguration following an error in the handover when the first handover command message is received from the serving node, the error being based on reconfiguration information received in a downlink message.

12. The method of claim 11, further comprising transmitting a message to the target node to support the handover of the wireless terminal, wherein the message indicates the highest sequence number for the messages sent to the serving node.

13. The method of claim 11, further comprising receiving a message from the target node to support the handover of the wireless terminal, wherein the message received from the target node indicates the highest sequence number for the messages received from the serving node.

14. The method of claim 13, wherein determining whether the wireless terminal has received the stale message from the target node comprises determining that a message received from the target node comprises a sequence number equal to or less than the highest sequence number of the messages received from the serving node is a stale message.

15. The method of claim 14, further comprising ignoring the stale message received from the target node following handover.

16. A non-transitory computer-readable medium for use in a wireless terminal to handover the wireless terminal from a serving node to a target node in a radio access network, the non-transitory computer-readable medium including instructions stored thereon, the instructions comprising:

program code to exchange messages with a serving node to support the handover of the wireless terminal, each of the exchanged messages being assigned an identifier comprising sequence numbers, and sequence numbers assigned to uplink messages being independent of sequence numbers assigned to downlink messages;

program code to determine whether the wireless terminal has received a stale message when a first handover command message is not received from a serving node, the stale message comprising a second handover command message from the target node transmitted after the handover based on the identifier; and program code to abort a portion of a reconfiguration following an error in the handover when the first handover command message is received from the serving node, the error being based on reconfiguration information received in a downlink message.

17. The non-transitory computer-readable medium of claim 16, wherein the instructions further comprise program code to transmit a message to the target node to support the handover of the wireless terminal, wherein the message indicates the highest sequence number for the messages sent to the serving node.

18. The non-transitory computer-readable medium of claim 16, wherein the instructions further comprise program code to receive a message from the target node to support the handover of the wireless terminal, wherein the message received from the target node indicates the highest sequence number for the messages received from the serving node.

19. The non-transitory computer-readable medium of claim 18, wherein the program code to determine further comprises program code to determine whether a message received from the target node comprises a sequence number equal to or less than the highest sequence number of the messages received from the serving node is a stale message.

20. The non-transitory computer-readable medium of claim 19, wherein the instructions further comprise program code to ignore the stale message received from the target node following the handover.

* * * * *